United States Patent
Hellmann et al.

(10) Patent No.: US 6,941,215 B2
(45) Date of Patent: Sep. 6, 2005

(54) METHOD AND DEVICE FOR TRIGGERING A REQUEST FOR TAKING CONTROL IN ACC-CONTROLLED VEHICLES

(75) Inventors: Manfred Hellmann, Hardthof (DE); Hermann Winner, Karlsruhe (DE); Albrecht Irion, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 09/980,147
(22) PCT Filed: Feb. 14, 2001
(86) PCT No.: PCT/DE01/00552
§ 371 (c)(1),
(2), (4) Date: Mar. 26, 2002
(87) PCT Pub. No.: WO01/72545
PCT Pub. Date: Oct. 4, 2001

(65) Prior Publication Data
US 2003/0130783 A1 Jul. 10, 2003

(30) Foreign Application Priority Data
Mar. 28, 2000 (DE) .......................... 100 15 299

(51) Int. Cl.$^7$ .............................. G06F 7/00; G06F 17/00
(52) U.S. Cl. .......................... 701/93; 701/96; 701/301; 180/169; 180/179; 342/455
(58) Field of Search .......................... 701/93, 96, 301; 180/169, 179; 340/903; 342/455

(56) References Cited

U.S. PATENT DOCUMENTS

| | | | |
|---|---|---|---|
| 6,233,515 B1 | * | 5/2001 | Engelman et al. ............ 701/96 |
| 6,362,729 B1 | * | 3/2002 | Hellmann et al. .......... 340/436 |
| 2002/0105423 A1 | * | 8/2002 | Rast |
| 2002/0198632 A1 | * | 12/2002 | Breed et al. |

FOREIGN PATENT DOCUMENTS

| | | |
|---|---|---|
| DE | 195 44 923 | 6/1996 |
| EP | 0 348 691 | 3/1994 |
| EP | 107 88 03 | 2/2001 |
| WO | WO 99/58359 | 11/1999 |

OTHER PUBLICATIONS

"Adaptive Cruise Control System Aspects and Development Trends," WINNER et al, SAE Transactions, Society of Automotive Engineers, Inc., Warrendale, PA, Bd. 105, Nr. 961010, 1996.

* cited by examiner

Primary Examiner—William A. Cuchlinski, Jr.
Assistant Examiner—Olga Hernandez
(74) Attorney, Agent, or Firm—Kenyon & Kenyon

(57) ABSTRACT

In a method and a device for triggering a request for taking control (RTC), a driver of a vehicle having adaptive cruise control is signaled that the adaptive cruise control system may not be capable of controlling a driving situation, and that the driver may have to intervene, the signaling of the driver being generated in accordance with at least two vehicle variables, whereby the probability of a false alarm by the system is reduced, and the triggering of the RTC is adapted to the instantaneous vehicle speed.

10 Claims, 3 Drawing Sheets

METHOD AND DEVICE FOR TRIGGERING A REQUEST FOR TAKING CONTROL IN ACC-CONTROLLED VEHICLES

FIELD OF THE INVENTION

The present invention relates to a method and a device for triggering a request for taking control (RTC) in vehicles having adaptive cruise control.

BACKGROUND INFORMATION

Methods and devices for regulating speed and/or acceleration are conventional under the term "tempomat". Supplementing such a device with a sensor, which can recognize preceding vehicles and/or obstacles located in the direction of travel, is also known. These devices may utilize, in the control of vehicle speed, not only their own internal traffic variables, but also traffic variables of the surroundings. Such devices are denoted as adaptive or dynamic vehicle speed controllers or adaptive cruise control (ACC). Such an adaptive travel regulating system may be a convenient assistance to a driver. Therefore, the acceleration and deceleration dynamics, with which the control system activates the forward propulsion and the brakes of the vehicle, may be limited. Furthermore, the adaptive vehicle speed regulator neither should nor can relieve the driver of any responsibility. Instead, the regulator may only relieve the driver of monotonous and tiring activities. Therefore, existing ACC systems may be deliberately made incapable of independently initiating either sharp or full braking, even though the sensory system may be capable of recognizing dangerous situations. In these dangerous situations, existing ACC systems provide a so-called request for taking control,- which is activated when the maximum deceleration provided by the automatic system may be no longer sufficient to avoid a collision. The request for taking control signals the driver acoustically, optically, haptically or kinesthetically that manual intervention using the brake pedal may become necessary. In supplementary fashion, the driver has priority over the vehicle control system at all times, in that he may operate the gas or brake pedal and override or deactivate the system, thereby putting the automatic drive control out of commission.

A fundamental description of such a device is referred to in the paper "Adaptive Cruise Control—System Aspects and Development Trends," given by Winner, Witte et al., at SAE 96, Feb. 26 to 29, 1996 in Detroit (SAE Paper No. 961010). The paper discusses the dynamic restriction of the system for the purpose of riding comfort.

The request for taking control is mentioned in this article as possibly being an acoustic signal which is activated when no sufficient deceleration can be made available so as to react fittingly to the instantaneous situation.

One method and device for travel regulation are described in German Published Patent Application No. 195 44 923. The system includes a radar system and a vehicle speed sensor, from the measured values of which, an acceleration requirement signal is formed. This signal is then used to activate the throttle and the brakes (EGAS system). A limiter assures that the acceleration requirement signal does not exceed the range between a predefined maximum or minimum value, in order to guarantee a designated travel comfort to vehicle passengers. In this system, the driver is notified by a blinking light, a tone generator, a haptic device or a combination of these possibilities. These signal elements are activated when the current deceleration requirement of the vehicle exceeds or approximately reaches the maximum permissible deceleration for the vehicle, and the vehicle is subject to travel control at the same time. European Published Patent No. 0 348 691 describes concepts for haptic signaling. However, no method is described which points to a reference for triggering a request for taking control.

SUMMARY OF THE INVENTION

It is an object of the present invention to provide criteria with the aid of which the activation of a request for taking control may be triggered, so that the frequency of false alarms may be reduced to a minimum.

This object may be achieved by simultaneously satisfying at least two criteria with respect to deceleration values for activating the request for taking control. In one example embodiment, the two criteria include inequalities with regard to the deceleration values aSoll and aWarn, which must be fulfilled simultaneously before the request for taking control is activated. In this connection, the two deceleration-related variables lead to as complete as possible a reduction in false alarms. Furthermore, the decision thresholds "aMaxDecel+Offset1" 221 and "aMaxDecel+Offset2" 231 of these criteria are not provided as constant threshold values. Instead, they are changed dynamically as a function of instantaneous values, such as vehicle speed.

The acceleration requirement may be used for the activation of actuators, for the setting of a throttle and/or for brake operation. In the present case, the acceleration requirement is denoted as aWarn. If aWarn undershoots a negative acceleration value which corresponds to the brake energizing hysteresis, the vehicle may be decelerated using a braking force in accordance with the absolute value of aWarn. If short term error measurements appear, the system may trigger a request for taking control, even though the situation would not require it. In this manner, false alarms may be created, which may irritate the driver and make the system appear unsophisticated.

To solve this problem, a second acceleration value is introduced, which is subsequently denoted as aSoll. This value aSoll, in addition to aWarn, must undershoot a certain negative acceleration threshold, denoted as "aMaxDecel+Offset2" 231, before the request for taking control can be triggered. The value aSoll may be passed to the brake control or, in the case of propulsion, to the engine control, where it may be used to recalculate a desired engine torque. In order to impart comfort to the vehicle passengers, the value aSoll, which acts directly on the power train and the deceleration elements, may be restricted in several ways. For instance, the maximum admissible acceleration value may be limited by a positive and/or a negative limiting value, so as to impart a comfortable riding sensation. Furthermore, the change over time of the acceleration value may be bounded by limiter 103, in order to prevent a "jolt" in response to a load alteration. Or, the two switching thresholds "aMaxDecel+Offset1" 221 and "aMaxDecel+Offset2" 231 for the input values aWarn and aSoll respectively, may be changed during vehicle operation in accordance with the instantaneous driving situation. For example, the value aMaxDecel may be formed as a function of the instantaneous driving speed, and the starting point of the deceleration can be selected differently for different speeds.

These innovations, according to an example embodiment of the present invention, may avoid false alarms of the ACC request for taking control. If the system recognizes an object in the travel-path area of the vehicle, even for a very short duration (e.g., through disturbances in the side lane or error measurements), the request for taking control is no longer triggered immediately, but rather braking is begun. If the object disappears before the instantaneous deceleration aSoll corresponds to about the maximum deceleration "aMaxDecel+Offset2" 231 available to the system, braking is discontinued without jolting, and the vehicle continues under normal operation. However, if the detected object does not disappear, and the instantaneous deceleration approaches or reaches the maximum deceleration "aMaxDecel+Offset2" available to the system, the request for taking control 109 may be triggered, if the system predicts that it can no longer decelerate the vehicle in time or in sufficient measure. Further, since braking action may be different at high speeds as compared to low speeds, the system may control the automatic braking action of the ACC system in accordance with the instantaneous speed, in order to generate a braking action which corresponds to that of a responsible driver. This may yield a comfortable and pleasant traveling experience, in view of the time gradient limitation of the value aSoll.

DETAILED DESCRIPTION

Figure 1:
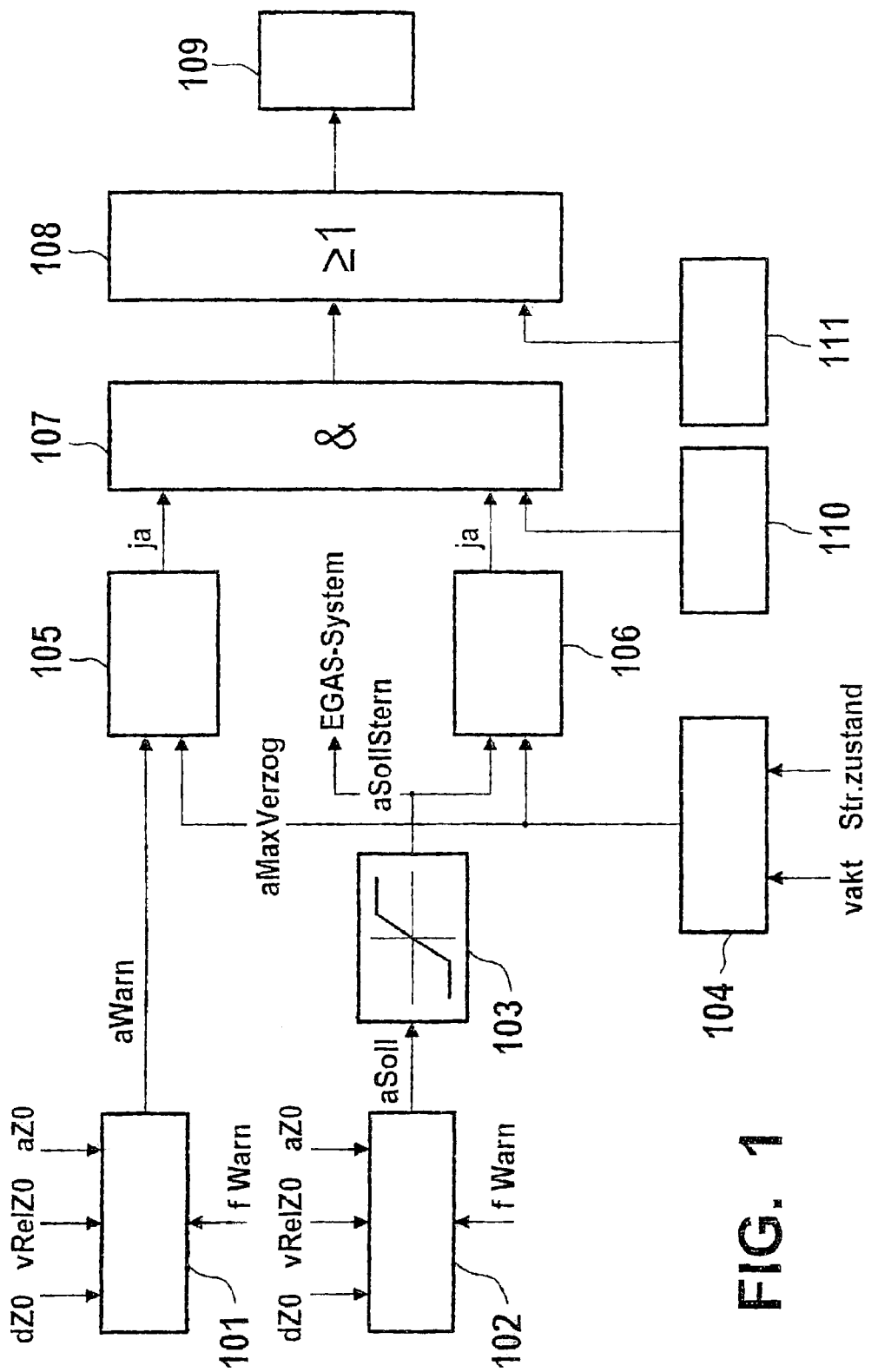
FIG. 1 is a block diagram of an example embodiment according to the present invention.

FIG. 1 is a block diagram of an ACC system that represents how the decision to trigger the request for taking control is formed. The distance dZO between one's own and a preceding vehicle, the relative speed of the target object vRelZO in relation to the preceding vehicle, and the acceleration of the target object aZO enter as input variables into function block 101, in which the value aWarn is formed. The formation of the value aWarn may be accomplished by calculation of a mathematical formula or by storing a characteristics map or table in block 101. In the case of mathematical formula, aWarn may be calculated from $$a\text{Warn} = ((\text{sign}(v\text{RelZO})(v\text{RelZO})^2)/(2d\text{Warn})) + a\text{ZO} \quad (1)$$

where, in turn, the warning distance dWarn (the relative deceleration path) is calculated from $$d\text{Warn} = (f\text{Warn } d\text{ZO}) - \text{Offset3} \quad (2)$$

fWarn is a factor which may be either definitely predefined as a parameter or variably calculated, for example, in accordance with a set time gap. Using this factor fWarn, for example, the time gap set by the driver or a travel program (comfortable, safe, economical, sporty, . . . ) predefined by the driver may be taken into consideration.

The value of aWarn thus calculated is then passed on to function block 105.

In function block 102, in a manner similar to block 101, using the input variables distance dZO, the relative speed of the target object vRelZO and the acceleration of the target object aZO, the value aSoll is formed. As in block 101, the formation of aSoll may be accomplished by mathematical formula or by storing characteristics maps or tables. The value aSoll thus formed is then routed to a limiter which limits the value with respect to minimum or maximum values and a time-related acceleration change. The limited value is then routed to decision block 106 as the value aSollStar. At the same time, aSollStar is passed on to the throttle control and the brake control, which are referred to in FIG. 1 as "EGAS System", where they are used in propulsion and braking systems. In function block 104 the maximum deceleration controllable by the ACC system, aMaxDecel, is formed and forwarded to decision blocks 105 and 106. The maximum deceleration controllable by the adaptive driving speed regulating system, "aMaxDecel+Offset2", is changed in blocks 105 and 106 as a function of the instantaneous driving speed, so that the system provides, at all times, a dynamics region that is as great as possible but nevertheless comfortable.

In block 105 an inequality is monitored. Block 105 determines whether the condition $$a\text{Warn} < a\text{MaxDecel} + \text{Offset1} \quad (3)$$

is fulfilled. If so, a signal is sent to AND element 107 that the condition examined in block 105 is fulfilled. Similarly, decision block 106 determines whether the condition $$a\text{SollStar} < a\text{MaxDecel} + \text{Offset2} \quad (4)$$

is fulfilled, using input values aSollStar and aMaxDecel. If inequality (4) is fulfilled, decision block 106 signals to AND element 107 that the trigger condition is fulfilled.

The offset values Offset1 and Offset2 are parameters that allow the warning thresholds of equations (3) and (4) to be further varied and optimized.

The AND element 107 monitors whether all inputs report simultaneously that the conditions of decision blocks 105 and 106 are fulfilled.

If so, AND element 107 signals the OR element 108 that the conditions for triggering the request for taking control are fulfilled. The OR element 108 signals the request for taking control block 109 that the latter is to be triggered and that the driver is thereby notified that the comfortable braking of the system is not sufficient for obtaining enough deceleration.

Function block 110, which is connected to one of the inputs of AND element 107, and function block 111, which is connected to an input of OR element 108, allow additional criteria to be considered with regard to activating the request for taking control.

The output of function block 110 is connected to the input of AND element 107. Block 110 may monitor the active operational state. For example, block 110 may monitor the operational state of the ACC control and report it to block 107. Further, block 110 may include a function of speed as an AND condition, which may permit activation of the request for taking control only when the vehicle fulfills certain speed requirements. This may allow the activation of the taking-control signal only when the ACC control and regulating device may actively control the gas and the brakes.

In the same manner, a self-diagnosing function may be used to determine whether the ACC control and regulating device is functioning properly. In case the device does not work without error, an output signal is generated in function block 111, which OR element 108 receives, thereby causing the activation of the request for taking control. This arrangement guarantees that the driver is requested to take control in the case of operational failure, and that the ACC control and regulating device can switch itself off safely following the activation of the brake pedal. Furthermore, the sensor function may be checked to ensure that it is properly functioning. Further, the system may process a blindness recognition signal, a rain recognition signal, or a signal which brings about a warning of standing objects in one's own lane, during limited vision conditions, such as fog.

Figure 2:
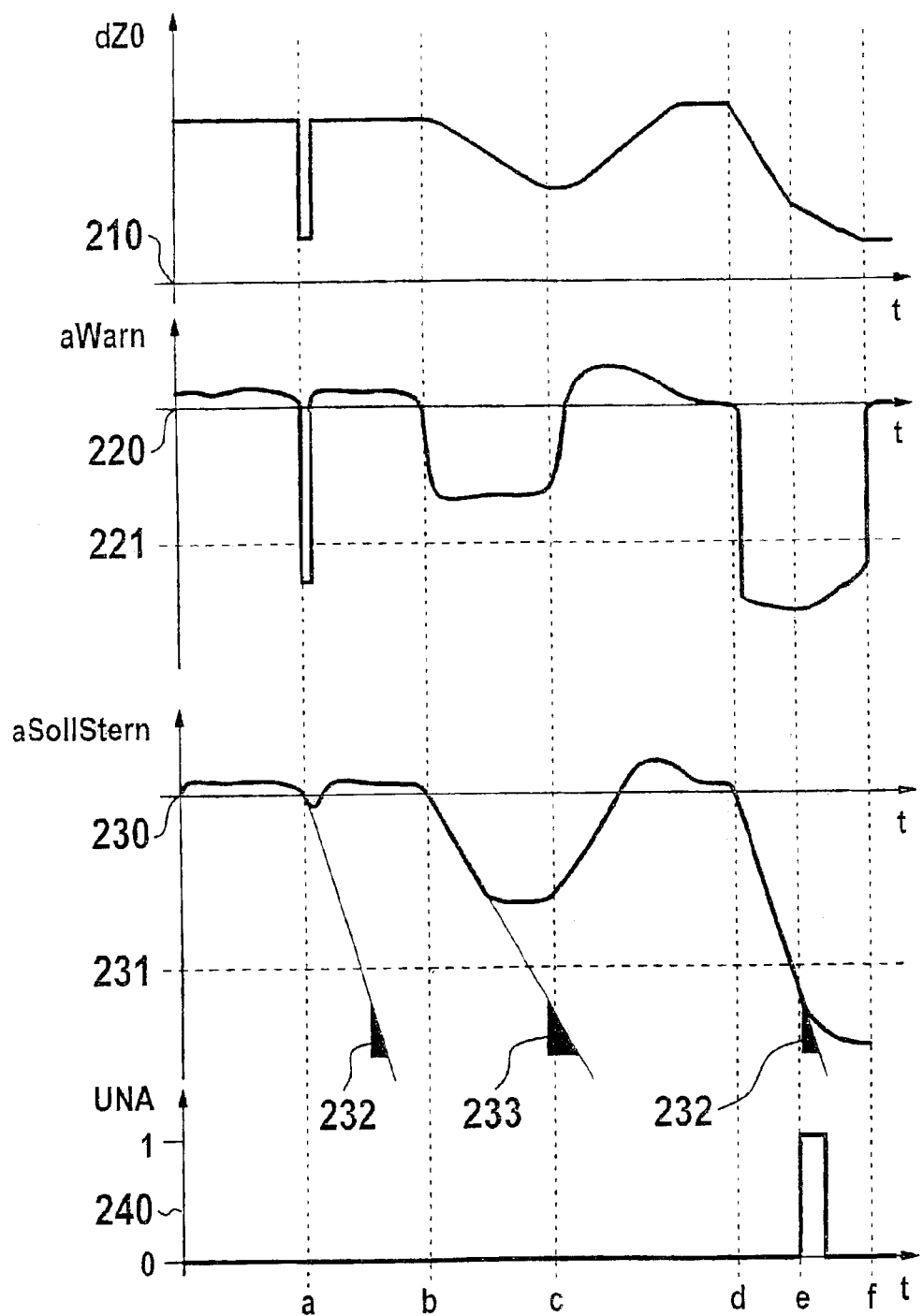
FIG. 2 illustrates an example functional sequence scenario which may occur during operation of a vehicle under ACC, the sequence scenario being made up of four partial diagrams, each of which plots one variable of the ACC system versus time.

FIG. 2 illustrates an example functional sequence scenario which may occur during operation of a vehicle under ACC. The example scenario includes four diagrams, each of which plots one characteristic variable against time. In diagram 210, the distance to target object dZO is plotted against time. In diagram 220, the warning acceleration aWarn is plotted against time. The drawn-in borderline 221 denotes a threshold value "aMaxDecel+Offset1". When this threshold is exceeded, a corresponding signal is passed on to AND element 107 in FIG. 1.

In diagram 230, the restricted desired acceleration aSollStar is plotted against time. The variable aSollStar is the variable which is also passed to the control for the electronically controlled throttle (EGAS) or the electronically controlled brake. The drawn-in value 231 represents the threshold value "aMaxDecel+Offset2", at the undershooting of which a corresponding signal is also passed on to AND element 107. In diagram 240, the request for taking control is represented as a digital signal. Here the transition from "0" to "1" indicates the activation of a signal for the request for taking control. The pulse duration of the RTC(t) signal is a function of the duration of the taking-control signal. When the signaling is ended, the RTC(t) curve transitions from "1" to "0".

The four diagrams 210, 220, 230 and 240 are arranged in such a way that their respective time lines run parallel. Thus, the vertical dotted lines of FIG. 2 each intersect the four time lines at the same point in time, each intersected point in time being labeled with Latin letters (a to f) at the bottom of FIG. 2.

At point in time t=0 in dZO-t diagram 210, a certain constant distance dZO(t=0) separates the ACC-controlled vehicle and the preceding vehicle.

At point in time t=a an additional object of reflection suddenly appears at a very short distance from the ACC-controlled vehicle, is detected for only a very short time, and then disappears suddenly. In this case, the system tries to make available a strong deceleration which is far below warning threshold 221 of the aWarn-t diagram 220. As a result, block 105 in FIG. 1 passes a corresponding signal to AND element 107. Signal aSollStar, which also controls the propulsion and brake elements, is created essentially in the same way as aWarn, the only difference being that aSollStar is limited as to a maximum value as well as a gradient. Thus jumps, steep transitions and values great in amount are excluded from the calculation of aSollStar. Until the desired end values for aSollStar are adjusted, a certain time lapses. Thus, aSollStar may be denoted as being inert or delaying compared to aWarn. In the aSollStar-t diagram 230 the gradient for the curve tangents in each case is a gradient triangle. Thus the gradient of gradient triangles 232 is equal in amount to the maximum possible gradient, since at time point t=a, at least the maximum deceleration controllable by the ACC is required. The deceleration requirement at point t=a lasts only a very short time, so that the curve in aSollStar-t diagram 230 does not reach triggering threshold 231. Thus, no triggering signal is sent by block 106 to AND element 107 and, thus, the RTC-t curve in 240 remains at "0." As a result, the request for taking control is not activated.

Between the two time points t=b and t=c, the preceding vehicle applies its brakes gently. Point t=b is the starting point in time of this gentle brake maneuver and point t=c is the end point in time of this brake maneuver. The distance dZO in diagram 210 decreases during this time, until the brake maneuver is ended at point in time t=c. The deceleration values aWarn in diagram 220 are so small in amount between t=b and t=c that triggering threshold 221 is not reached, since braking is so slight that the brake dynamics region of the ACC system is sufficient for a corresponding deceleration. In the aSollStar-t diagram 230 this becomes noticeable in that the curve takes a flatter course, and the tangent having gradient triangle 233 is also flatter than in the situation at point t=a. Since the ACC system is able to make available sufficient deceleration from t=b to t=c, in the case of this gentle braking, the curve in the RTC-t diagram 240 remains at "0", and, therefore, a request for taking control is not activated.

Between time points t=c and t=d, the preceding vehicle accelerates, which becomes noticeable by the increase in distance dZO and the decrease of the deceleration.

At point t=d, the preceding vehicle decelerates again, but very strongly this time. The value of aWarn immediately darts downwards and crosses the triggering threshold 221 of aWarn. The value of aSollStar drops off at the maximum steepness 232 possible, and reaches triggering threshold "aMaxDecel+Offset2" 231 at point in time t=e.

As of point in time t=e, both triggering criteria are simultaneously fulfilled, and triggering the request for taking control takes place as described in FIG. 1, by the AND element 107 and the OR element 108. Activation of the request is represented in the RTC-t diagram 240 by the transition from "0" to "1" at point t=e. At this point in time, the driver is informed that the deceleration of the ACC system is not sufficient to prevent a collision.

At time point t=f the driver steps on the brake pedal in order to achieve a greater deceleration than may be made available by the ACC system. As the driver intervenes by braking at point t=f, the ACC system is simultaneously deactivated.

Triggering thresholds 221 and 231 are not constant values, but rather are variable thresholds, which may be made functions of parameters such as speed. However, curves "aWarn(t)" 220 and aSoll(t)" 230 are normalized in each case with respect to thresholds 221 and 231, for the purpose of making FIG. 2 more understandable. The normalization causes the variable thresholds themselves to appear as constant values on the diagrams of FIG. 2 (i.e., as horizontals in the diagram).

The calculation of aWarn may take into consideration not only the necessity of reducing the present relative speed within the distance available dWarn, but also the absolute deceleration of the target object which has to be additionally produced to avoid a collision. The value dWarn may further be modified by a factor fWarn, to take into account the time gap or a driving program predefined by the driver.

If the request for taking control is triggered at time point t=e, the system may either alarm the driver for a fixed, definite time period, or it may alarm the driver until the triggering criteria are no longer fulfilled. Necessarily, the request has to be activated for a minimum time, since even during a very short alarm period, the alarm must be noticeable to the driver and clearly understandable. Further, the system may also require a minimum time period to elapse between two requests for taking control, so as not to overload the driver with ACC alarms.

Beside changing the request for taking control by time conditions, one may also do it as a function of distance conditions. For example, a request for taking control that is once activated may remain until a minimum distance from the target object has been achieved or until the distance from the target object increases.

In the RTC-t diagram illustrated in FIG. 2, the deactivation of the request for taking control in the form of a negative transition from "1" to "0" is not shown, since this would have a different profile depending on time duration and resetting conditions.

By the use of the measures described in one of the mentioned example embodiments, the probability of a false activation of the ACC request for taking control may be drastically reduced. The motor vehicle driver may, thereby, have more trust in the request for taking control than in conventional systems, and the request for taking control will be received more meaningfully at the same time.

Figure 3:
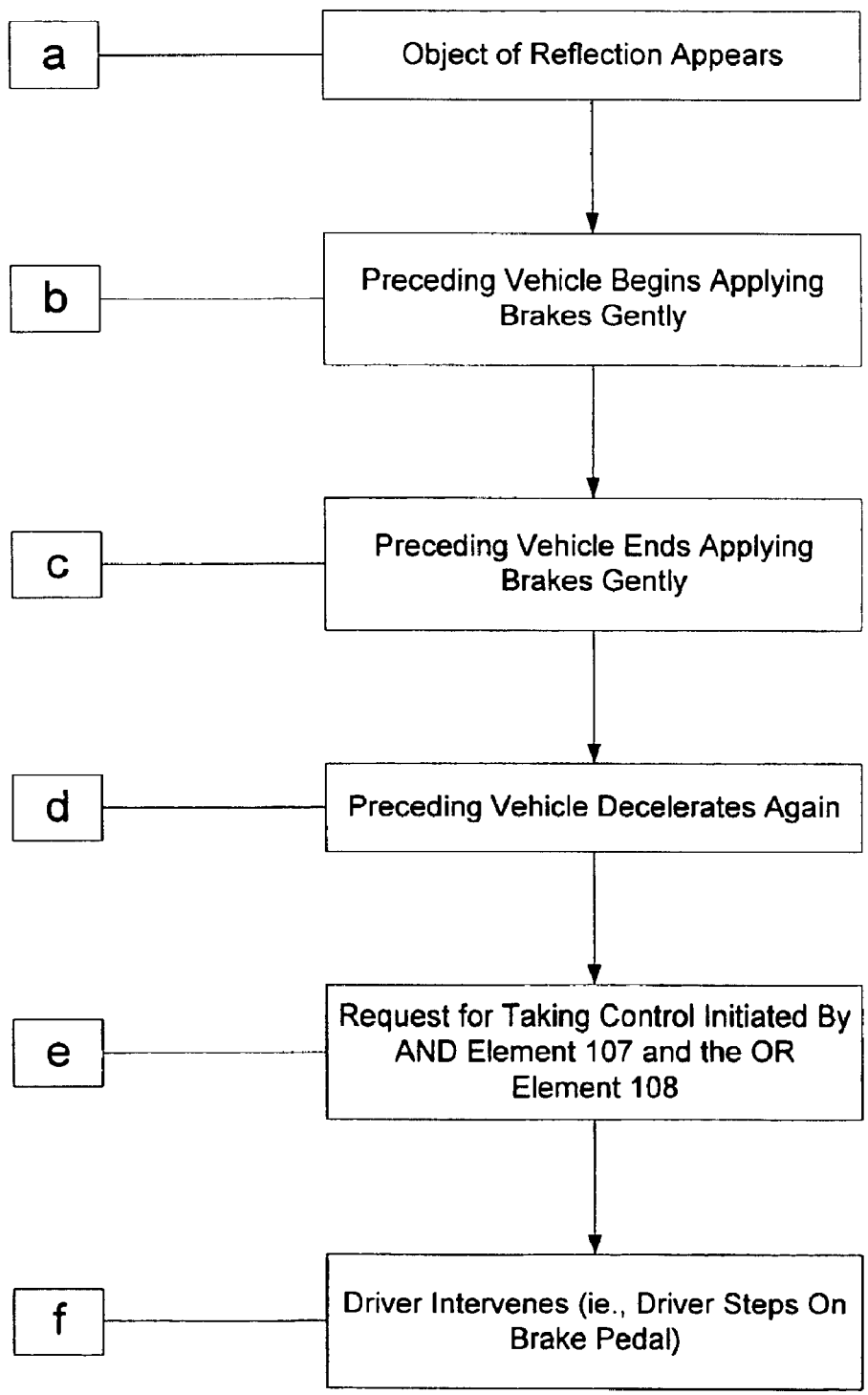
FIG. 3 shows a possible functional sequence scenario which can occur during operation of the vehicle under ACC, according to an example embodiment of the present invention.

FIG. 3 shows a possible functional sequence scenario which can occur during operation of the vehicle under ACC, according to an example embodiment of the present invention. At a, an additional object of reflection suddenly appears from nowhere, which is at a very short distance from the ACC-controlled vehicle, is detected for only a very short time, and disappears again just as suddenly. Between b and c, the preceding vehicle applies its brakes gently. It follows that b is the starting point in time of this gentle brake maneuver and that c is the end point in time of this brake maneuver. At point d, the preceding vehicle decelerates again, but not very strongly this time. At e, both triggering criteria are simultaneously fulfilled, and triggering the request for taking control takes place as described in FIG. 1, by the AND element 107 and the OR element 108. This is illustrated in FIG. 2, in the RTC-T diagram 240 by the curve jumping from "0" to "1" at point t=e. At this point in time e the driver is informed that the deceleration of the ACC system is not sufficient to prevent a collision. At f, the driver decides to step on the brake pedal in order to achieve a greater deceleration than could be made available by the ACC system. As the driver intervenes by braking at f, the ACC system is simultaneously deactivated.

What is claimed is:

1. A method, for notifying a driver of a vehicle to inform the driver of activation of a request for the driver to take control of the vehicle, the vehicle having an adaptive cruise control, comprising the steps of:
   (a) signaling that at least one of a maximum braking force and pressure controllable by the adaptive cruise control is being applied and a deceleration therefrom is not sufficient to automatically decelerate the vehicle in time and to a sufficient degree; and
   (b) activating the request for the driver to take control when at least three criteria, including at least two criteria relating to deceleration values and one additional criteria, are simultaneously satisfied.

2. The method according to claim 1,
   wherein the at least two criteria include values corresponding to vehicle deceleration, one of the values being limited in accordance with at least one of a time-related change variable, a maximum steepness variable, and an absolute value variable.

3. The method according to claim 1,
   wherein a value of the at least one of the maximum braking force and pressure is changeable.

4. The method according to claim 3,
   wherein the value of the at least one of the maximum braking force and pressure is changeable as a function of at least one of a speed being instantaneously driven, road conditions and loading of the vehicle.

5. The method according to claim 1, wherein the criteria include a signal indicating that the adaptive cruise control is actively controlling the vehicle.

6. The method according to claim 1,
   wherein the request for the driver to take control includes at least one of a warning activated over a minimum time, an elapsed minimum time between two warnings, a warning maintained until a minimum distance from a preceding vehicle is achieved, a warning maintained until a distance from the preceding vehicle is increasing, and a warning maintained until the driver intervenes by operating one of a gas pedal, a brake pedal and an on/off switch.

7. The method according to claim 1,
   wherein the criteria includes at least one factor, the at least one factor one of predefined and variably calculated, the at least one factor converting a driver-selected driving program into an operating behavior of the ACC control automatic action.

8. A method for notifying a driver of a vehicle to inform the driver of activation of a request for the driver to take control of the vehicle, the vehicle having an adaptive cruise control, comprising the steps of:
   (a) signaling that at least one of a maximum braking force and pressure controllable by the adaptive cruise control is being applied and a deceleration therefrom is not sufficient to automatically decelerate the vehicle in time and to a sufficient degree;
   (b) activating the request for the driver to take control when at least two criteria relating to deceleration values are simultaneously satisfied; and
   (c) activating a request for the driver to take control when one of at least one further condition is satisfied independent of the activating step (b).

9. The method according to claim 8,
   wherein the further condition includes a signal indicating that an incorrect mode of operation of the adaptive cruise control has been detected.

10. A device for notifying a driver of a vehicle to inform the driver of an activation of a request for the driver to take control of the vehicle, the vehicle including an adaptive cruise control, the request for the driver to take control signalling that one of a maximum braking force and a maximum braking pressure controllable by the adaptive cruise control is being applied and that a deceleration resulting therefrom is not sufficient to automatically decelerate the vehicle in time and to a sufficient degree, comprising:
   an arrangement configured to activate the request for the driver to take control when at least three criteria including at least two criteria relating to decelaration values and one additional criteria are simultaneously satisfied.

* * * * *